US012762825B2

(12) United States Patent
Ravi Kumar et al.

(10) Patent No.: US 12,762,825 B2
(45) Date of Patent: Oct. 13, 2026

(54) ADAPTIVE LEARNABLE POOLING FOR OVERLAPPING CAMERA FEATURES

(71) Applicant: QUALCOMM Incorporated, San Diego, CA (US)

(72) Inventors: Varun Ravi Kumar, San Diego, CA (US); Meysam Sadeghigooghari, Linkoping (SE); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/506,583

(22) Filed: Nov. 10, 2023

(65) Prior Publication Data

US 2025/0157179 A1 May 15, 2025

(51) Int. Cl.

| | |
|---|---|
| ***G06V 10/44*** | (2022.01) |
| ***G06T 7/11*** | (2017.01) |
| ***G06T 7/70*** | (2017.01) |
| ***G06V 10/25*** | (2022.01) |
| ***G06V 10/80*** | (2022.01) |

(52) U.S. Cl.

CPC ................ *G06V 10/44* (2022.01); *G06T 7/11* (2017.01); *G06T 7/70* (2017.01); *G06V 10/25* (2022.01); *G06V 10/806* (2022.01); *G06T 2207/30252* (2013.01); *G06V 2201/07* (2022.01)

(58) Field of Classification Search

CPC ... G06T 7/11; G06T 7/70; G06T 2207/30252; G06V 10/25; G06V 10/44; G06V 10/806; G06V 2201/07

See application file for complete search history.

(56) References Cited

U.S. PATENT DOCUMENTS

| | | | | |
|---|---|---|---|---|
| 11,636,685 B1 * | 4/2023 | Volta | .................... | G05D 1/0274 382/103 |
| 12,313,727 B1 * | 5/2025 | Das | ......................... | G01S 7/417 |
| 2020/0160559 A1 * | 5/2020 | Urtasun | ................. | G06N 3/084 |
| 2020/0388005 A1 * | 12/2020 | Mueller | .................... | G06T 3/10 |
| 2021/0334556 A1 * | 10/2021 | Vignard | ................. | G06V 20/58 |
| 2021/0405638 A1 * | 12/2021 | Boyraz | .................. | G06V 20/64 |

(Continued)

OTHER PUBLICATIONS

Borse et al. "X-align: Cross-modal cross-view alignment for bird's-eye-view segmentation." Proceedings of the IEEE/CVF Winter Conference on Applications of Computer Vision. 2023. (Year: 2023).*

(Continued)

*Primary Examiner* — Katrina R Fujita
(74) *Attorney, Agent, or Firm* — Shumaker & Sieffert, P. A.

(57) ABSTRACT

An apparatus is configured to fuse features from a plurality of camera images using a set of learnable parameters. The apparatus may extract features from a respective image from each camera of a plurality of cameras, and fuse the features into a fused image having a grid structure. To fuse the features the apparatus may determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

26 Claims, 4 Drawing Sheets

(56) References Cited

U.S. PATENT DOCUMENTS

| | | | | |
|---|---|---|---|---|
| 2022/0301182 | A1* | 9/2022 | Mahjourian | G06V 20/584 |
| 2023/0294727 | A1* | 9/2023 | Oh | G06F 18/25<br>701/23 |
| 2024/0020953 | A1* | 1/2024 | Park | G06V 20/56 |
| 2024/0127596 | A1* | 4/2024 | Singh | G01S 13/931 |
| 2024/0192361 | A1* | 6/2024 | Gowaikar | G05D 1/247 |
| 2025/0085413 | A1* | 3/2025 | Yogamani | G01S 13/867 |

OTHER PUBLICATIONS

Liang et al. "Bevfusion: A simple and robust lidar-camera fusion framework." Advances in Neural Information Processing Systems 35 (2022): 10421-10434. (Year: 2022).*

Man et al. "Bev-guided multi-modality fusion for driving perception." Proceedings of the IEEE/CVF Conference on Computer Vision and Pattern Recognition. 2023. (Year: 2023).*

Zeng et al. "Lift: Learning 4d lidar image fusion transformer for 3d object detection." Proceedings of the IEEE/CVF conference on computer vision and pattern recognition. 2022. (Year: 2022).*

* cited by examiner

ADAPTIVE LEARNABLE POOLING FOR OVERLAPPING CAMERA FEATURES

TECHNICAL FIELD

This disclosure relates to sensor systems, including sensor systems for advanced driver-assistance systems (ADAS).

BACKGROUND

An autonomous driving vehicle is a vehicle that is configured to sense the environment around the vehicle, such as the existence and location of other objects, and to operate without human control. An autonomous driving vehicle may include multiple cameras that produce image data that may be analyzed to determine the existence and location of other objects around the autonomous driving vehicle.

In some examples, the output of multiple cameras is fused together to form a single fused image (e.g., a bird's eye view image). Various tasks may then be performed on the fused image, including image segmentation, object detection, depth detection, and the like. A vehicle having advanced driver-assistance systems (ADAS) is a vehicle that includes systems which may assist a driver in operating the vehicle, such as parking or driving the vehicle. The ADAS may use the outputs of the tasks performed on the fused image described above to make autonomous driving decisions.

SUMMARY

The present disclosure relates to techniques and devices for generating a fused image (e.g., a bird's eye view (BEV) image) having fused features from a plurality of different cameras or other sensors. A system may extract a respective set of features from respective images from a plurality of different cameras. The system may fuse the extracted features of the images into a single fused image having a grid structure. This disclosure describes techniques for fusing the features based on a set of learnable parameters and further based on which cameras contribute to each cell of the grid structure.

In one aspect, the system may determine which of the plurality of cameras contributes to each of the cells in the grid structure of the fused image. For example, in an automotive context, a vehicle may include multiple cameras placed on various locations on the vehicle, each camera having a different field-of-view (FOV). One or more of the cameras may have FOVs that overlap with each other in particular cells of the grid structure of the fused image. The system may determine which of the cameras contribute to a particular cell based on the configuration and type of camera. In some examples, this contribution information may be stored in a lookup table.

Based on which cameras contribute to a particular cell of the grid structure, the system may aggregate the features from each of the respective images to each respective cell of the fused image based on a set of learnable parameters to generate aggregated features. The learnable parameters may be in the form of weights that may be applied to the extracted features of each camera that contributes to the cell. Based on the location of the cell, the position of the camera, the FOV of the camera, and the type of camera (e.g., longer range pinhole cameras or shorter range fisheye cameras), each camera may be associated with a different learned weight for a particular cell. These weights may be learned during a training process prior to being used during inference time (e.g., during the generation of the fused image from the multiple cameras while the vehicle is in operation).

By incorporating learnable parameters (e.g., weights) for each cell in the grid structure, the techniques of this disclosure allow for adaptive feature pooling. This means that the pooling operation for each respective set of features takes into account the specific cameras/sensors contributing to each cell, resulting in a more context-aware representation of features. This adaptivity may enhance the ability of the system to capture relevant information from different cameras/sensors and their varying characteristics. Accordingly, subsequent processing of the fused image, such as object detection, depth detection, and/or image segmentation may be improved and autonomous driving decisions may be more accurate.

In one example, this disclosure describes an apparatus for processing image data, the apparatus comprising a memory for storing the image data, and processing circuitry in communication with the memory. The processing circuitry is configured to extract features from a respective image from each camera of a plurality of cameras, and fuse the features into a fused image having a grid structure, wherein to fuse the features, the processing circuitry is configured to determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

In another example, this disclosure describes a method for processing image data, the method comprising extracting features from a respective image from each camera of a plurality of cameras, and fusing the features into a fused image having a grid structure, wherein fusing the features comprises determining a contribution of the respective image from each of the plurality of cameras to a respective cell of the grid structure, and aggregating, based on the contribution to the respective cell and a respective set of learnable parameters for each cell, the features from each of the respective images to each respective cell of the fused image to generate aggregated features.

In another example, this disclosure describes a non-transitory computer-readable storage medium storing instructions that, when executed, cause one or more processors to extract features from a respective image from each camera of a plurality of cameras, and fuse the features into a fused image having a grid structure, wherein to fuse the features, the instructions further cause the one or more processors to determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

In another example, this disclosure describes an apparatus configured for processing image data, the apparatus comprising means for extracting features from a respective image from each camera of a plurality of cameras, and means for fusing the features into a fused image having a grid structure, wherein the means for fusing the features comprises means for determining a contribution of the respective image from each of the plurality of cameras to a respective cell of the grid structure, and means for aggregating, based on the contribution to the respective cell and a respective set of learnable parameters for each cell, the features from each of the respective images to each respective cell of the fused image to generate aggregated features.

The details of one or more examples are set forth in the accompanying drawings and the description below. Other features, objects, and advantages will be apparent from the description, drawings, and claims.

DETAILED DESCRIPTION

Figure 1:
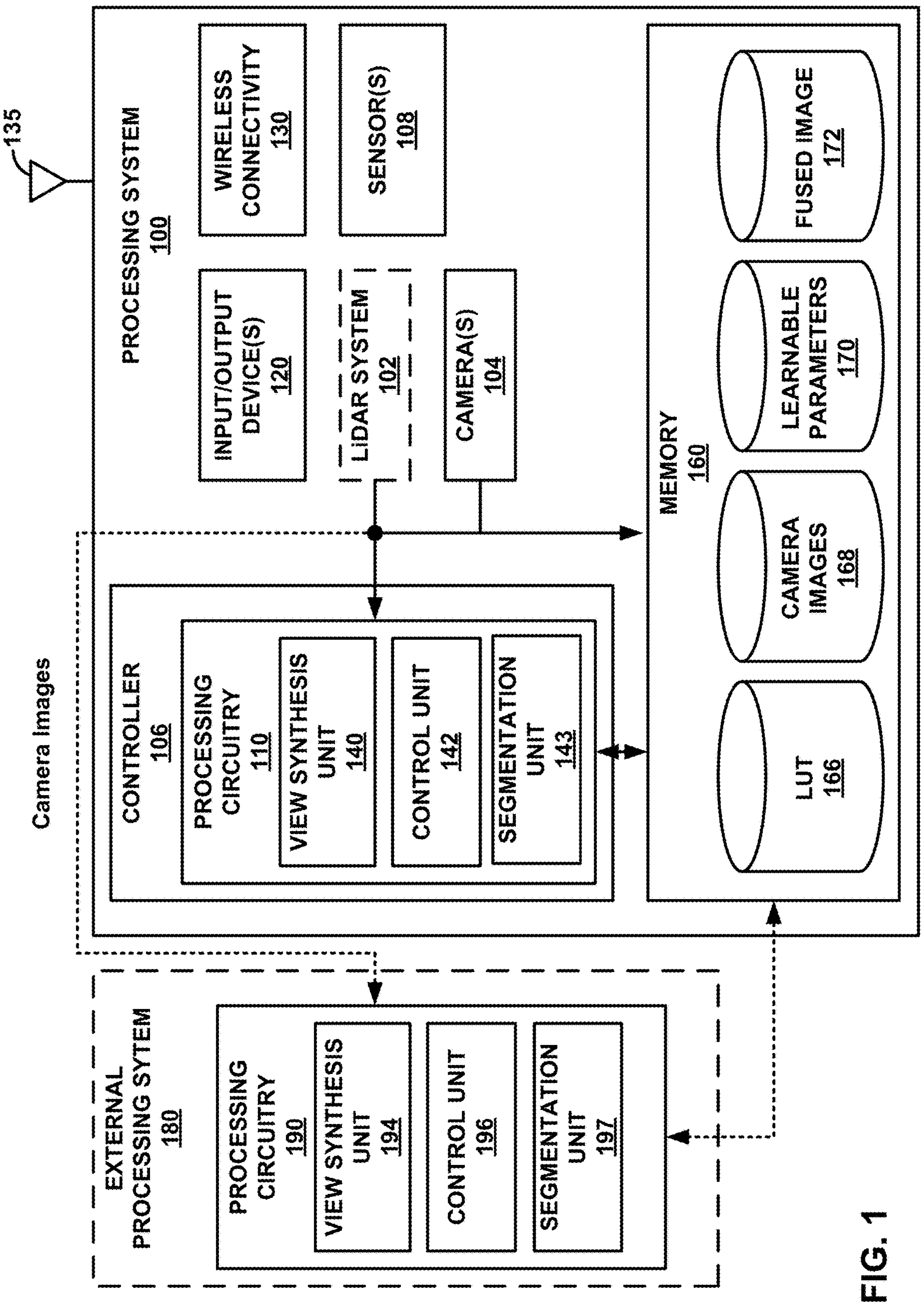
FIG. 1 is a block diagram illustrating an example processing system, in accordance with one to more techniques of this disclosure.

Camera images from a plurality of different cameras may be used together in various different robotic, vehicular, and virtual reality (VR) systems. One such vehicular application is an advanced driver assistance system (ADAS). ADAS is a system that may perform object detection and/or image segmentation process on camera images to make autonomous driving decisions, improve driving safety, increase comfort, and improve overall vehicle performance. An ADAS may fuse images from a plurality of different cameras into a single view (e.g., a bird's eye view (BEV)) to provide a more comprehensive view of a vehicle's surroundings, enabling the ADAS to better assist the driver in various driving scenarios.

The present disclosure relates to techniques and devices for generating a fused image (e.g., BEV image) having fused features from a plurality of different cameras or other sensors. A system may extract a respective set of features from respective images from a plurality of different cameras. The system may fuse the extracted features of the images into a single fused image having a grid structure. Some current examples techniques for summing features from different cameras in a BEV projection result in overlapping features in many cells of the BEV grid. This makes it difficult to distinguish between features captured by different cameras.

Also, different cameras in a vehicle capture features with varying characteristics. For example, fisheye cameras and wide angle (e.g., pinhole) cameras may provide different perspectives and levels of detail. However, current feature summation techniques treat all features equally, regardless of the sensor type. Examples of currently used pooling operations also treat features independently of their location in the grid structure. This ignores the fact that certain cameras/sensors might have better visibility or capture more relevant information depending on their proximity to the vehicle or the distance from the target object in the grid structure. In general, current summation approaches are often inefficient as they do not optimize the pooling operation specific sensor characteristics or the locations within the grid. This may lead to suboptimal feature representation and potentially impact the performance of downstream tasks or algorithms utilizing the fused feature map in the fused image (e.g., BEV image).

This disclosure describes techniques for fusing the features based on a set of learnable parameters and further based on which cameras contribute to each cell of the grid structure. Examples of the disclosure include replacing the static sum pooling operation with a weighted pooling, where the weights are learned for each cell of the grid structure in a fused image via back propagation. The techniques of this disclosure involves creating a learnable pooling operation that considers the specific sensors contributing to each cell in the grid.

Features of the disclosure include generating a lookup table that maps each cell to the cameras capturing features in that cell. The lookup table can be pre-computed based on camera configurations and fields of view. Features of the disclosure further include assigning a set of learnable parameters to each cell in the grid. In one example, one parameter is assigned to each camera that contributes to a cell. After projecting the features from the image to the grid structure of the fused image, instead of performing a simple sum pooling, the techniques of this disclosure include performing a weighted aggregation of features for each cell. The weights used for each feature of a camera are the learnable parameters assigned to the cell.

By incorporating learnable parameters (e.g., weights) for each cell in the grid structure, the techniques of this disclosure allow for adaptive feature pooling. This means that the pooling operation for each respective set of features takes into account the specific cameras/sensors contributing to each cell, resulting in a more context-aware representation of features. This adaptivity may enhance the ability of the system to capture relevant information from different cameras/sensors and their varying characteristics. Accordingly, subsequent processing of the fused image, such as object detection, depth detection, and/or image segmentation may be improved and autonomous driving decisions may be more accurate.

In one example, this disclosure describes an apparatus for processing image data, the apparatus comprising a memory for storing the image data, and processing circuitry in communication with the memory. The processing circuitry is configured to extract features from a respective image from each camera of a plurality of cameras, and fuse the features into a fused image having a grid structure, wherein to fuse the features, the processing circuitry is configured to determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

FIG. 1 is a block diagram illustrating an example processing system 100, in accordance with one to more techniques of this disclosure. Processing system 100 may be used in a vehicle, such as an autonomous driving vehicle or an assisted driving vehicle (e.g., a vehicle having an advanced driver-assistance systems (ADAS) or an "ego vehicle"). In such an example, processing system 100 may represent an ADAS.

While described with relation to an ADAS and BEV images, the techniques of this disclosure are not limited to processing image data in automotive contexts, or specifically with create BEV images. Processing system 100 may be applicable for use with any multi-camera and/or multi-sensor system where the output the cameras/sensors are used to create a fused, synthesized, and/or reconstructed output. That is, processing system 100 may be used for any view synthesis or view construction use case where a single output (e.g., fused image) with a mesh or grid structure is created from multiple sources. Examples may include extended reality (XR) systems, virtual reality (VR) systems, spherical or 3-D video, and others.

Processing system 100 may include LiDAR system 102 (optional), camera(s) 104, controller 106, one or more sensor(s) 108, input/output device(s) 120, wireless connectivity component 130, and memory 160. LiDAR system 102 may include one or more light emitters (e.g., lasers) and one or more light sensors. LiDAR system 102 may, in some cases, be deployed in or about a vehicle. For example, LiDAR system 102 may be mounted on a roof of a vehicle, in bumpers of a vehicle, and/or in other locations of a vehicle. LiDAR system 102 may be configured to emit light pulses and sense the light pulses reflected off of objects in the environment. LiDAR system 102 is not limited to being deployed in or about a vehicle. LiDAR system 102 may be deployed in or about another kind of object.

In some examples, the one or more light emitters of LiDAR system 102 may emit such pulses in a 360-degree field around the vehicle so as to detect objects within the 360-degree field by detecting reflected pulses using the one or more light sensors. For example, LiDAR system 102 may detect objects in front of, behind, or beside LiDAR system 102. While described herein as including LiDAR system 102, it should be understood that another distance or depth sensing system may be used in place of LiDAR system 102. The output of LiDAR system 102 are called point clouds or point cloud frames.

Camera(s) 104 may be any type of camera configured to capture video or image data in the environment around processing system 100 (e.g., around a vehicle). In some examples, processing system 100 may include multiple cameras 104. For example, camera(s) 104 may include a front facing camera (e.g., a front bumper camera, a front windshield camera, and/or a dashcam), a back facing camera (e.g., a backup camera), side facing cameras (e.g., cameras mounted in sideview mirrors). Camera(s) 104 may be a color camera or a grayscale camera. In some examples, camera(s) 104 may be a camera system including more than one camera sensor. While techniques of this disclosure will be described with reference to a 2D photographic camera, the techniques of this disclosure may be applied to the outputs of other sensors, including a sonar sensor, a radar sensor, an infrared camera, and/or a time-of-flight (ToF) camera.

Wireless connectivity component 130 may include subcomponents, for example, for third generation (3G) connectivity, fourth generation (4G) connectivity (e.g., 4G Long Term Evolution (LTE)), fifth generation (5G) connectivity (e.g., 5G or New Radio (NR)), Wi-Fi connectivity, Bluetooth connectivity, and other wireless data transmission standards. Wireless connectivity component 130 is further connected to one or more antennas 135.

Processing system 100 may also include one or more input and/or output devices 120, such as screens, touch-sensitive surfaces (including touch-sensitive displays), physical buttons, speakers, microphones, and the like. Input/output device(s) 120 (e.g., which may include an I/O controller) may manage input and output signals for processing system 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processing circuitry 110). In some cases, a user may interact with a device via input/output device(s) 120 or via hardware components controlled by input/output device(s) 120.

Controller 106 may be an autonomous or assisted driving controller (e.g., an ADAS) configured to control operation of processing system 100 (e.g., including the operation of a vehicle). For example, controller 106 may control acceleration, braking, and/or navigation of vehicle through the environment surrounding vehicle. Controller 106 may include one or more processors, e.g., processing circuitry 110. Controller 106 is not limited to controlling vehicles. Controller 106 may additionally or alternatively control any kind of controllable object, such as a robotic component.

Processing circuitry 110 may include one or more central processing units (CPUs), such as single-core or multi-core CPUs, graphics processing units (GPUs), digital signal processor (DSPs), application specific integrated circuits (ASICs), field programmable gate arrays (FPGAs), neural processing unit (NPUs), multimedia processing units, and/or the like. Instructions applied by processing circuitry 110 may be loaded, for example, from memory 160 and may cause processing circuitry 110 to perform the operations attributed to processor(s) in this disclosure. In some examples, one or more of processing circuitry 110 may be based on an Advanced Reduced Instruction Set Computer (RISC) Machine (ARM) or a RISC five (RISC-V) instruction set.

An NPU is generally a specialized circuit configured for implementing control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processing circuitry 110 may also include one or more sensor processing units associated with LiDAR system 102, camera(s) 104, and/or sensor(s) 108. For example, processing circuitry 110 may include one or more image signal processors associated with camera(s) 104 and/or sensor(s) 108, and/or a navigation processor associated with sensor(s) 108, which may include satellite-based positioning system components (e.g., Global Positioning System (GPS) or Global Navigation Satellite System (GLONASS)) as well as inertial positioning system components. In some aspects, sensor(s) 108 may include direct depth sensing sensors, which may function to determine a depth of or distance to objects within the environment surrounding processing system 100 (e.g., surrounding a vehicle).

Processing system 100 also includes memory 160, which is representative of one or more static and/or dynamic memories, such as a dynamic random-access memory, a flash-based static memory, and the like. In this example, memory 160 includes computer-executable components, which may be applied by one or more of the aforementioned components of processing system 100.

Examples of memory 160 include random access memory (RAM), read-only memory (ROM), electrically erasable programmable ROM (EEPROM), compact disk ROM (CD-ROM), or another kind of hard disk. Examples of memory 160 include solid state memory and a hard disk drive. In some examples, memory 160 is used to store computer-readable, computer-executable software including instructions that, when applied, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 160 store information in the form of a logical state.

Processing system 100 may be configured to perform techniques for generating a fused image (e.g., BEV image) having fused features from a plurality of different cameras or other sensors. For example, processing circuitry 110 may include view synthesis unit 140. View synthesis unit 140 may be implemented in software, firmware, and/or any combination of hardware described herein. As will be described in more detail below, view synthesis unit 140 may be configured to receive a plurality of camera images 168 captured by camera(s) 104. View synthesis unit 140 may extract a respective set of features from camera images 168 and may fuse the extracted features of the images into a single fused image having a grid structure (e.g., a BEV image). View synthesis unit 140 may be configured to receive camera images 168 from camera(s) 104 or from memory 160.

As described above, some current examples techniques for summing features from images captured by different cameras in a BEV projection result in overlapping features in many cells of a BEV grid. This makes it difficult to distinguish between features captured by different cameras. Also, different cameras in a vehicle capture features with varying characteristics. For example, fisheye cameras and wide angle (e.g., pinhole) cameras may provide different perspectives and levels of detail.

Current feature summation techniques treat all features equally, regardless of the sensor type. Examples of currently used pooling operations also treat features independently of their location in the grid structure. This ignores the fact that certain cameras/sensors might have better visibility or capture more relevant information depending on their proximity to the vehicle or the distance from the target object in the grid structure. In general, current summation approaches are often inefficient as they do not optimize the pooling operation specific sensor characteristics or the locations within the grid. This may lead to suboptimal feature representation and potentially impact the performance of downstream tasks or algorithms utilizing the fused feature map in the fused image (e.g., BEV image).

In accordance with the techniques of this disclosure, view synthesis unit 140 may be configured to generate a fused image 172 (e.g., a BEV image) with fused features extracted from a plurality of a camera images 168. View synthesis unit 140 is configured to fuse the extracted features based on a set of learnable parameters 170 and further based on which of cameras(s) 104 contribute to each cell of the grid structure of fused image 172. Examples of the disclosure include replacing a static sum pooling operation or other pooling operations with a weighted pooling, where the weights are learned (e.g., via back propagation) for each cell of the grid structure in fused image 172. In this example, the set of learnable parameters 170 may include the weights. View synthesis unit 140 uses a learnable pooling operation that considers the specific camera(s) 104 contributing to each cell in the grid of fused image 172.

View synthesis unit 140 may use lookup table (LUT) 166 to learn the learnable parameters 170. LUT 166 maps each cell to the specific camera(s) 104 contributing features in that cell. LUT 166 may be pre-computed based on the locations, types, configurations, and field-of-view of camera(s) 104. View synthesis unit 140 may assign a set of learnable parameters 170 to each cell in a grid structure of fused image 172. In one example, one parameter is assigned to each camera of camera(s) 104 that contributes to a cell. After projecting the features from the image to the grid structure of fused image 172, instead of performing a simple sum pooling, view synthesis unit 140 performs a weighted aggregation of features for each cell. The weights used for each feature of a camera are the learnable parameters 170 assigned to the cell.

By incorporating learnable parameters 170 (e.g., weights) for each cell in the grid structure of fused image 172, the techniques of this disclosure allow for adaptive feature pooling. This means that the pooling operation for each respective set of features takes into account the specific camera(s) 104 contributing to each cell, resulting in a more context-aware representation of features. This adaptivity may enhance the ability of the system to capture relevant information from different cameras of camera(s) 104 and their varying characteristics. Accordingly, subsequent processing of the fused image, such as object detection, depth detection, and/or image segmentation may be improved and autonomous driving decisions may be more accurate.

In one example, as will be described in more detail below, view synthesis unit 140 may be configured to extract features from a respective image from each camera of a plurality of cameras. View synthesis may then fuse the features into a fused image (e.g., fused image 172) having a grid structure. To fuse the features, view synthesis unit 140 may determine a contribution of the respective image from each of the plurality of cameras to a respective cell of the grid structure. View synthesis unit 140 may then aggregate, based on the contribution to the respective cell and a respective set of learnable parameters 170 for each cell, the features from each of the respective images to each respective cell of the fused image 172 to generate aggregated features.

Segmentation unit 143 may be configured to perform one or more 3D semantic segmentation and/or object detection processes on the fused features produced by view synthesis unit 140. Segmentation unit 143 may then use the fused point cloud for 3D semantic segmentation and/or object detection purposes. Examples of 3D image segmentation process may include one or more of object detection, object classification, thresholding segmentation, region-based segmentation, edge-based segmentation, clustering-based segmentation, semantic segmentation, or instance segmentation.

Processing circuitry 110 of controller 106 may apply control unit 142 to control an object (e.g., a vehicle, a robotic arm, or another object that is controllable by processing system 100) based on the output generated by view synthesis unit 140 and/or segmentation unit 143. Control unit 142 may control the object based on information included in the output generated by view synthesis unit 140 and/or segmentation unit 143 relating to one or more objects within a 3D space including processing system 100. For example, the output generated by view synthesis unit 140 and/or segmentation unit 143 may include an identity of one or more objects, a position of one or more objects relative to the processing system 100, characteristics of movement (e.g., speed, acceleration) of one or more objects, or any combination thereof. Based on this information, control unit 142 may control the object corresponding to processing system 100. The output from view synthesis unit 140 and/or segmentation unit 143 may be stored in memory 160.

The techniques of this disclosure may also be performed by external processing system 180. That is, encoding input data, transforming features into a fused image, weighing features, fusing features, and decoding features, may be performed by a processing system that does not include the various sensors shown for processing system 100. Such a process may be referred to as "offline" data processing, where the output is determined from a set of test point clouds and test images received from processing system 100. External processing system 180 may send an output to processing system 100 (e.g., an ADAS or vehicle).

External processing system 180 may include processing circuitry 190, which may be any of the types of processors described above for processing circuitry 110. Processing circuitry 190 may include a view synthesis unit 194 and segmentation unit 197 configured to perform the same processes as view synthesis unit 140 and segmentation unit 143. Control unit 196 may be configured to perform any of the techniques described as being performed by control unit 142. Processing circuitry 190 may acquire camera images 168 directly from camera(s) 104 or from memory 160. Though not shown, external processing system 180 may also include a memory.

Figure 2:
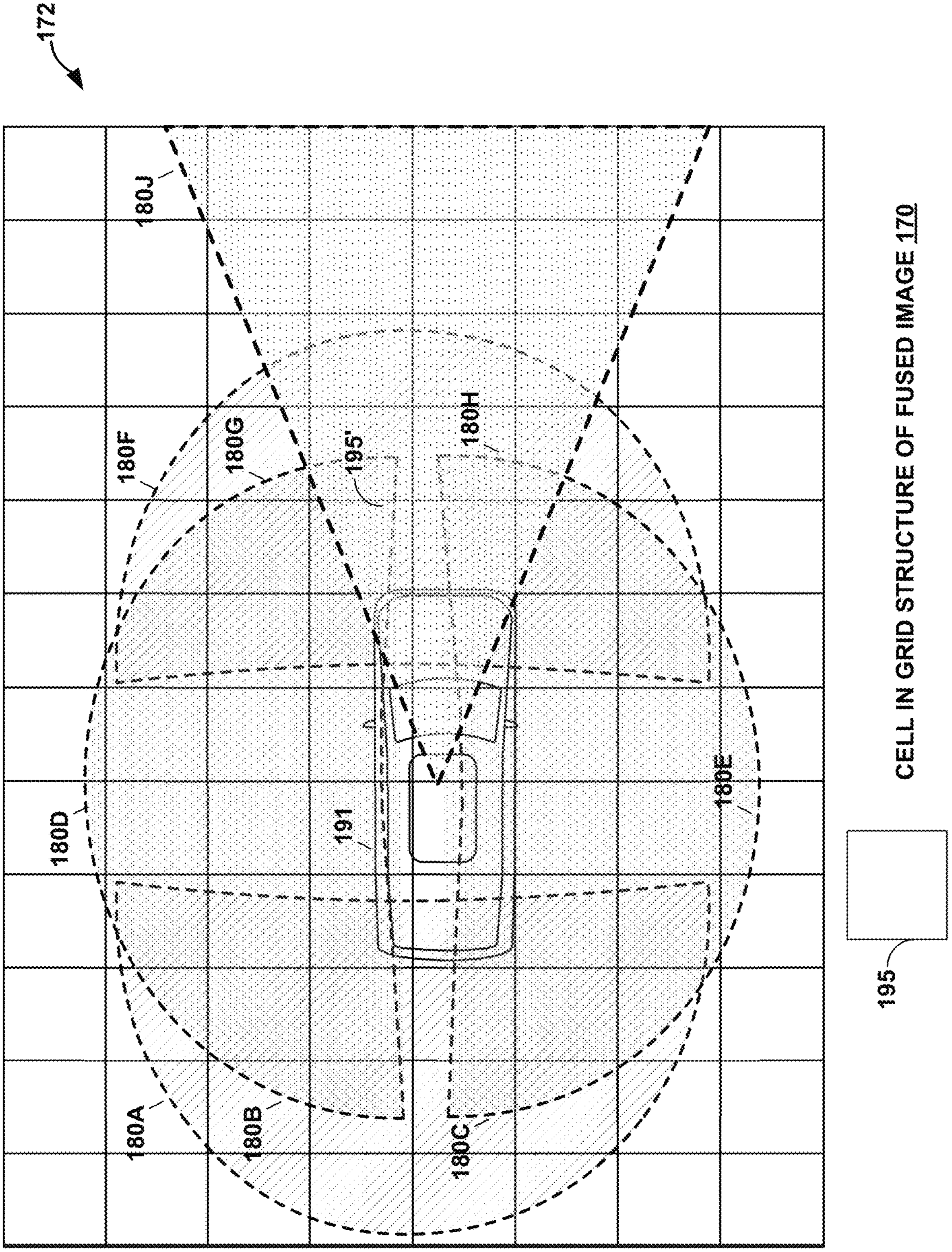
FIG. 2 is a conceptual diagram illustrating an example of overlapping cameras in a grid structure of a fused image.

FIG. 2 is a conceptual diagram illustrating an example of overlapping cameras in a grid structure of a fused image. FIG. 2 shows an example where fused image 172 is an BEV image around vehicle 191. In one example processing system 100 is part of vehicle 191. However, fused image 172 may be any type of image having a mesh or grid structure that may be reconstructed or synthesized from a plurality of different cameras. Non-limiting examples may include automotive systems, extended reality (XR) systems, virtual reality (VR) systems, spherical or 3-D video, and others.

As shown in FIG. 2, fused image 10 has a grid structure including cells 195. FIG. 2 is a simplified example shows a 12×8 grid structure. Each cell 195 of the grid structure of fused image 172 represents a physical location some distance from the camera system used to create the fused image (e.g., the camera system of vehicle 1952). A common grid structure for a BEV image includes 128×128 cells. However, any number of cells may be used in accordance with the techniques of this disclosure. A fused image with a denser grid structure (e.g., more cells) is more computationally complex, but offers a finer granularity of features. A fused image with a sparser grid structure (e.g., fewer cells) is less computationally complex, but offers a coarser granularity of features.

FIG. 2 shows an example where vehicle 191 includes 9 cameras (e.g., camera(s) 104 of FIG. 1). The hashed areas in FIG. 2 illustrate the FOV of each of the cameras. A rear camera may have FOV 180A. A rear left camera may have FOV 180B and a rear right camera may have FOV 180C. In general, FOV 180B and FOV 180C may be indicative of cameras with a shorter depth of field relative to FOV 180A. The rear left and rear right cameras may be fish eye cameras. FOV 180D and FOV 180E may be captured by left and right side cameras, respectively.

A front left camera may have FOV 180G and a front right camera may have FOV 180H. One wider angle front camera may have FOV 180F, while a narrower angle front camera may have FOV 180J. In general, FOV 180G and FOV 180H may be indicative of cameras with a shorter depth of field relative to FOV 180F and 180J. FOV 180J has an even deeper FOV than FOV 180F. The narrower angle front camera associated with FOV 180J may be a pinhole camera.

As can be seen in FIG. 2, the FOVs of the various cameras overlap in particular cells 195 of fused image 172. If a particular FOV overlaps with a cell 195, features from images captured by that camera are considered to contribute to the features of the cell 195 in fused image 172. For example, cameras that produce FOV 180F, FOV 180G, and FOV 180J contribute features to cell 195'.

Figure 3:
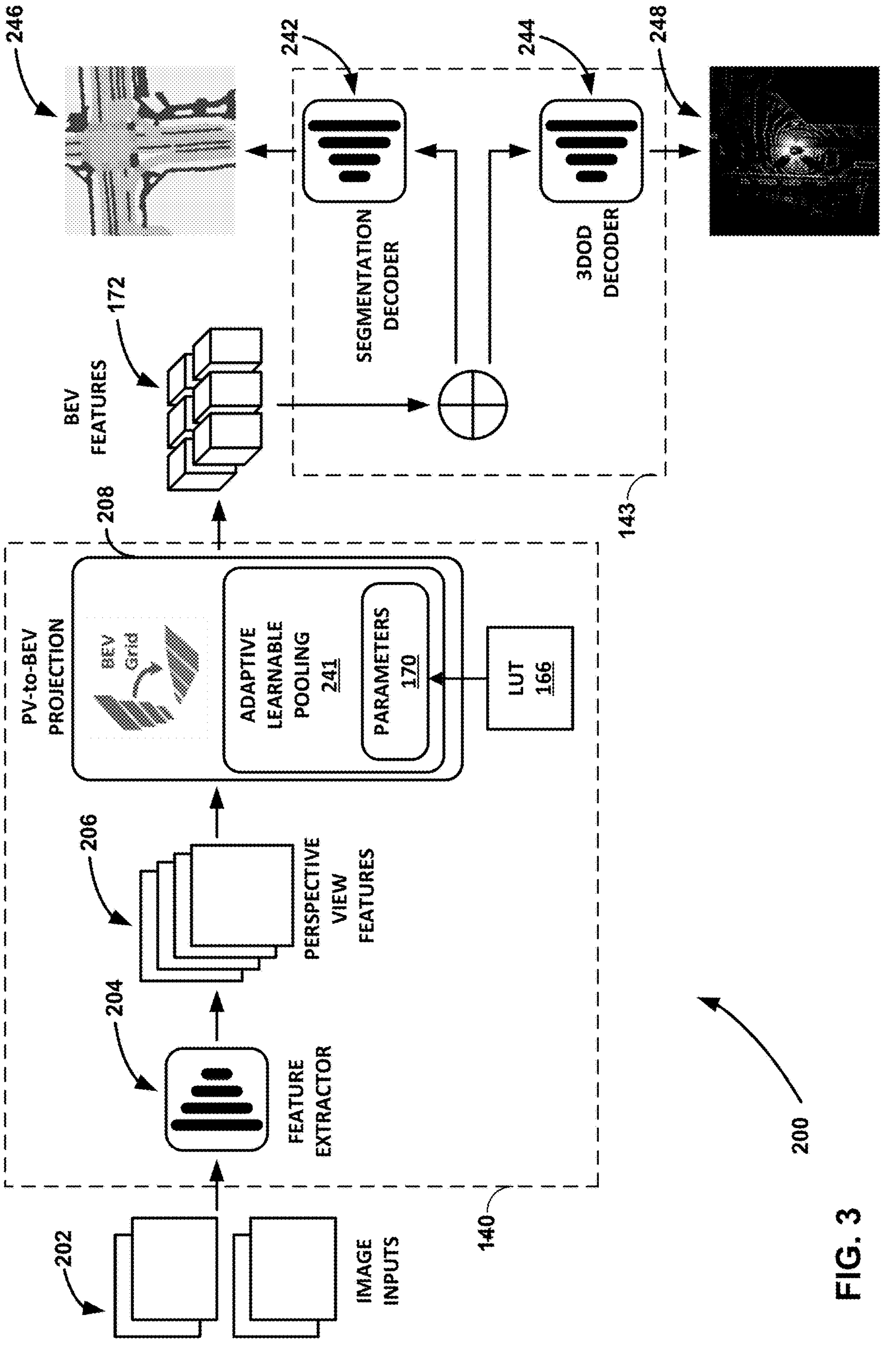
FIG. 3 is a block diagram illustrating an encoder-decoder architecture for fusing features from a plurality of cameras in accordance with one or more techniques of this disclosure.

FIG. 3 is a block diagram illustrating an encoder-decoder architecture 200 for fusing features from multiple images and performing one or more segmentation techniques, in accordance with one or more techniques of this disclosure. Encoder-decoder architecture 200 is an example of processing circuitry 110 and/or processing circuitry 190 of FIG. 1 that may be configured to perform the techniques of this disclosure. In this example, encoder-decoder architecture 200 may include view synthesis unit 140 (or view synthesis unit 194) and segmentation unit 143 (or segmentation unit 197) of FIG. 1.

Encoder-decoder architecture 200 may receive camera images 202 as inputs. Camera images 202 may be camera images captured at the same time from a plurality of different cameras at different locations and/or different fields of view which may be overlapping. For example, camera images 202 may be from the cameras having the FOVs depicted in FIG. 2 and/or may be camera images 168 of FIG. 1. In some examples, encoder-decoder architecture 200 processes camera images 202 in real time or near real time so that as camera(s) 104 (see FIG. 1) captures camera images 202, encoder-decoder architecture 200 processes the captured camera images. In some examples, camera images 202 may represent one or more perspective views of one or more objects within a 3D space where processing system 100 is located. That is, the one or more perspective views may represent views from the perspective of processing system 100.

Encoder-decoder architecture 200 includes encoder 204, decoder 242 (e.g., a segmentation decoder), and decoder 244 (e.g., a 3D object detection (3DOD) decoder). Encoder-decoder architecture 200 may be configured to process image data, but other types of sensor data may be processed in other examples. An encoder-decoder architecture for image feature extraction is commonly used in computer vision tasks, such as image captioning, image-to-image translation, and image generation. Encoder-decoder architecture 200 may transform input data into a compact and meaningful representation known as a feature vector (generally, "features") that captures salient visual information from the input data. The term feature may generally refer to a representation learned from the input image that captures certain patterns or characteristics of objects found in the image. The encoder may extract features from the input data, while the decoder reconstructs the input data from the learned features.

In some cases, encoder 204 is built using convolutional neural network (CNN) layers to analyze input data in a hierarchical manner. The CNN layers may apply filters to capture local patterns and gradually combine them to form higher-level features. Each convolutional layer extracts increasingly complex visual representations from the input data. These representations may be compressed and down sampled through operations such as pooling or strided convolutions, reducing spatial dimensions while preserving desired information. The final output of the encoder may represent a feature vector that encodes the input data's high-level visual features. Decoder 242 and/or decoder 244 may be built using transposed convolutional layers or fully connected layers, may reconstruct the input data from the learned feature representation. A decoder may take the feature vector obtained from the encoder as input and processes it to generate an output that is similar to the input data. The decoder may up-sample and expand the feature vector, gradually recovering spatial dimensions lost during encoding. A decoder may apply transformations, such as transposed convolutions or deconvolutions, to reconstruct the input data. The decoder layers progressively refine the output, incorporating details and structure until a visually plausible image is generated.

During training, an encoder-decoder architecture for feature extraction is trained using a loss function that measures the discrepancy between the reconstructed image and the ground truth image. This loss guides the learning process, encouraging the encoder to capture meaningful features and the decoder to produce accurate reconstructions. The training process may involve minimizing the difference between the generated image and the ground truth image, typically using backpropagation and gradient descent techniques.

An encoder-decoder architecture for image feature extraction may comprise one or more encoders that extract high-level features from the input data and one or more decoders that reconstruct the input data from the learned features. This architecture may allow for the transformation of input data into compact and meaningful representations. The encoder-decoder framework may enable the model to learn and utilize important visual and positional features, facilitating tasks like image generation, captioning, and translation.

Encoder 204 may represent an encoder of a neural network or another kind of model that is configured to extract information from input data and process the extracted information to generate an output. In general, encoders are configured to receive data as an input and extract one or more features from the input data. The features are the output from the encoder. The features may include one or more vectors of numerical data that can be processed by a machine learning model. These vectors of numerical data may represent the input data in a way that provides information concerning characteristics of the input data. In other words, encoders are configured to process input data to identify characteristics of the input data.

In some examples, the encoder 204 represents a CNN, another kind of artificial neural network (ANN), or another kind of model that includes one or more layers and/or nodes. Each layer of the one or more layers may include one or more nodes. Examples of layers include input layers, output layers, and hidden layers between the input layers and the output layers. A CNN, for example, may include one or more convolutional layers comprising convolutional filters. Each convolutional filter may perform one or more mathematical operations on the input data to detect one or more features such as edges, shapes, textures, or objects. CNNs may additionally or alternatively include activation functions that identify complex relationships between elements of an image and pooling layers that recognize patterns regardless of location within the image frame.

Encoder 204 may extract a set of perspective view (PV) features 206 based on camera images 202. That is, encoder 204 may extract features from a respective image of camera images from each camera of a plurality of cameras (e.g., camera(s) 104 of FIG. 1). Perspective view features 206 may provide information corresponding to one or more objects depicted in camera images 202 from the perspective of camera(s) 104 which captures camera images 202. For example, perspective view features 206 may include vanishing points and vanishing lines that indicate a point at which parallel lines converge or disappear, a direction of dominant lines, a structure or orientation of objects, or any combination thereof. Perspective view features 206 may include color information. Additionally, or alternatively, perspective view features 206 may include key points that are matched across a group of two or more camera images of camera images 202. Key points may allow encoder-decoder architecture 200 to determine one or more characteristics of motion and pose of objects. Perspective view features 206 may, in some examples, include depth-based features that indicate a distance of one or more objects from the camera, but this is not required. Perspective view features 206 may include any one or combination of image features that indicate characteristics of camera images 202.

It may be beneficial for encoder-decoder architecture 200 to transform perspective view features 206 into BEV features that represent the one or more objects within the 3D environment on a grid structure from a perspective looking down at the one or more objects from a position above the one or more objects. Since encoder-decoder architecture 200 may be part of an ADAS for controlling a vehicle, and since vehicles move generally across the ground in a way that is observable from a bird's eye perspective, generating BEV features (e.g., fused features from multiple cameras) may allow a control unit (e.g., control unit 142 and/or control unit 196) of FIG. 1 to control the vehicle based on the representation of the one or more objects from a bird's eye perspective. Encoder-decoder architecture 200 is not limited to generating fusing BEV features for controlling a vehicle. Encoder-decoder architecture 200 may generate fused features for controlling another object such as a robotic arm and/or perform one or more other tasks involving image segmentation, depth detection, object detection, or any combination thereof.

Projection unit 208 may transform perspective view features 206 into fused features in fused image 172. Such a transformation may be referred to as a PV-to-BEV projection. In some examples, projection unit 208 may generate a 2D grid and project the perspective view features 206 onto the 2D grid. For example, projection unit 208 may perform perspective transformation to place objects closer to the camera on the 2D grid and place objects further form the camera on the 2D grid. In some examples, the 2D grid may include a predetermined number of rows and a predetermined number of columns, but this is not required. Projection unit 208 may, in some examples, set the number of rows and the number of columns. In any case, projection unit 208 may generate the fused features (e.g., BEV features) in fused image 172 that represent information present in perspective view features 206 on a 2D grid including the one or more objects from a perspective above the one or more objects looking down at the one or more objects.

In some examples, projection unit 208 may use one or more self-attention blocks and/or cross-attention blocks to transform perspective view features 206 into the set of BEV features of fused image 172. Cross-attention blocks may allow projection unit 208 to process different regions and/or objects of perspective view features 206 while considering relationships between the different regions and/or objects. Self-attention blocks may capture long-range dependencies within perspective view features 206. This may allow a BEV representation of the perspective view features 206 to capture relationships and dependencies between different elements, objects, and regions in the BEV representation.

When performing the PV-to-BEV projection, projection unit 208 may fuse perspective view features 206 into fused image 172, where fused image 172 has a grid structure (e.g., as shown in FIG. 2). To fuse perspective view features 206, projection unit 208 may be configured to determine a contribution of the respective image of images 202 to a respective cell of the grid structure of the fused image 172.

As one example, projection unit 208 may determine, from lookup table (LUT) 166, the contribution of the respective image from each of a plurality of cameras to the respective cell of the grid structure of fused image 172. LUT 166 may indicate the contribution of a respective image of each of images 202 to a respective cell of the grid structure of fused image 172 based on one or more of a configuration (e.g., location and/or FOV) of the plurality of cameras or a type (e.g., depth of field, pinhole, fisheye, etc.) of the plurality of cameras. In some examples, projection unit 208 may be configured to generate the lookup table based on one or more of a configuration of the plurality of cameras or a type of the plurality of cameras. In other examples, projection unit 208 may be configured to receive a pre-computed lookup table. Rather than using a LUT, projection 208 may be configured to access information that maps each cell to the cameras capturing features in that cell from other types of memory or through any communication means.

To fuse the features, projection unit 208 may be further configured to aggregate the features from each of the respective images to each respective cell of the fused image to generate aggregated features. The aggregation is based on the contribution to the respective cell (e.g., as indicated by LUT 166) and a respective set of learnable parameters 170 for each cell. In one example, for each respective cell of the grid structure, the respective set of learnable parameters 170 includes a weight for each of the plurality of cameras that contribute to the respective cell. In some examples, the set of learnable parameters 170 may be stored in an accessed from LUT 166.

Adaptive learnable pooling unit 241 may be configured to aggregate, in each cell of the grid structure, the features from respective images 202 that contribute to each particular cell. That is, adaptive learnable pooling unit 241 may only aggregate features in a cell if the respective image of images 202 actually contributes to each cell. The learnable parameters 170 may be configured as weights that indicate how much each camera images features should be weighted for each cell. One feature of the present disclosure is to replace a static sum pooling or max pooling operation with a weighted pooling, where the weights (e.g., learnable parameters 170) are learned for each cell of the BEV space via back propagation or some other learning process. Rather than just adding together all features that contribute to a cell (static sum pooling), or taking only the maximum feature value for a cell (e.g., max pooling), the techniques of this disclosure allows for weighted aggregation of features across multiple inputs, where the weights or each input are learnable.

The techniques of this disclosure include using a learnable pooling operation that considers the specific sensors (e.g., cameras) contributing to each cell in the BEV grid. For each cell in the BEV grid, adaptive learnable pooling unit 241 may assign a set of learnable parameters 170, where one parameter is assigned for each camera (e.g., camera image) that contributes to the cell (e.g., as indicated by LUT 166). Adaptive learnable pooling unit 241 uses learnable parameters 170 to weight the features captured by each camera within the cell.

In one example, during a training process, adaptive learnable pooling unit 241 initialized learnable parameters 170 as 1 divided by the number of cameras projecting to the cell. This ensures that the initial weights are evenly distributed among the contributing cameras. Denote the set of learnable parameters 170 for a cell i as $W_i$, and the number of cameras contributing to cell i as $N_i$. The initialization of learnable parameters 170 can be represented as:

$$W_{i=}\left[1/N_{i,}1/N_i, \ldots, 1/N_i\right](N_i \text{ times})$$

To learn the optimal weights for each cell, adaptive learning poling unit 24 may be configured to adaptively update learnable parameters 170 through backpropagation during a training process. The entire network of encoder-decoder architecture 200 may be trained end-to-end, including learnable parameters 170 associated with each cell. During the backward pass of the training, gradients for learnable parameters 170 may be calculated based on a loss function and used to update learnable parameters 170. The specific optimization algorithm (e.g., gradient descent) and loss function depend on the overall network architecture and the specific task being performed.

To ensure that the weights of learnable parameters 170 for each cell add up to one, a constraint can be added to the training process. This constraint penalizes deviations from the sum of weights being equal to one. By adding this constraint to the total loss function, the optimization process is encouraged to find weights that maintain the desired property. The specific form of the constraint and how it is incorporated into the loss function depends on the chosen optimization framework and the requirements of the task. Once the training is completed, the learned weights of learnable parameters 170 can be used in a static manner during inference time without any additional computational cost.

As described above, the set of learnable parameters 170 may be learned through a training process, for example, perform on encoder-decoder architecture 200 of FIG. 3. In one example, to aggregate the features, adaptive learnable pooling unit 241 may calculate the aggregated features according to the following function:

$$\text{aggregated\_features}_i = W_i[1]\cdot F_{i1} + W_i[2]\cdot F_{i2} + \ldots\ W_i[N_i]\cdot F_{iNi}.$$

In the foregoing function, i represents the respective cell, $\text{aggregated\_features}_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i. As such, $W_i[k]$ would represent the kth learnable parameter for cell i, and $F_{ik}$ represents the features captured by the kth camera for cell i.

By incorporating the learnable parameters and weighting the features based on the contributing cameras, the proposed solution enables adaptive pooling that considers the specific sensors and their locations in the BEV space, leading to more efficient and context-aware feature representation. This adaptivity enhances the ability to capture relevant information from different cameras and their varying characteristics.

The techniques of this disclosure also optimizes the pooling operation based on the characteristics of the sensors/ cameras involved. Rather than simply summing up features, the techniques of this disclosure include the assignment learnable weights to each contributing camera's features. This enables the pooling operation to leverage the strengths of different sensors, considering factors such as their field of view, resolution, or proximity to the target object. As a result, the pooling operation becomes more efficient and effective in utilizing sensor information.

In addition, the techniques of this disclosure takes into account the spatial location of cells within a grid structure of fused image 172. By assigning different weights to features based on their contributing cameras, the techniques of this disclosure can account for the varying visibility and relevance of different sensors depending on their proximity to the capturing cameras or the distance from the target object. This location-aware feature aggregation improves the representation of the BEV space, providing a more accurate and informative feature map.

The learnable parameters associated with each cell enable the pooling operation to adapt and optimize itself during the training process. By updating these parameters through backpropagation, the pooling operation can learn to assign appropriate weights to different cameras and locations, capturing the most relevant information and enhancing the overall performance of downstream tasks. Once the learnable parameters are trained, they can be used in a static manner during inference, without any additional computational cost. This allows for efficient and fast feature pooling during real-time applications, as the learned weights can be directly applied to the BEV feature map of fused image 172 without requiring further optimization or adaptation. Overall, the proposed solution provides adaptability, efficiency, and improved representation in pooling features from overlapping camera projections in the BEV, leading to enhanced performance in autonomous driving.

Encoder-decoder architecture 200 may include further segmentation unit 143 that includes decoder 242 and decoder 244. In some examples, each of decoder 242 and decoder 244 may represent a CNN, another kind of ANN, or another kind of model that includes one or more layers and/or nodes. Each layer of the one or more layers may include one or more nodes. Examples of layers include input layers, output layers, and hidden layers between the input layers and the output layers. In some examples, a decoder may include a series of transformation layers. Each transformation layer of the set of transformation layers may increase one or more spatial dimensions of the features, increase a complexity of the features, or increase a resolution of the features. A final layer of a decoder may generate a reconstructed output that includes an expanded representation of the features extracted by an encoder.

Decoder 242 may be configured to generate a first output 246 based on the fused set of BEV features in fused image 172. The first output 246 may comprise a 2D BEV representation of the 3D environment corresponding to processing system 100. For example, when processing system 100 is part of an ADAS for controlling a vehicle, the first output 246 may indicate a BEV view of one or more roads, road signs, road markers, traffic lights, vehicles, pedestrians, and other objects within the 3D environment corresponding to processing system 100. This may allow processing system 100 to use the first output 246 to control the vehicle within the 3D environment.

Since the output from decoder 242 includes a bird's eye view of one or more objects that are in a 3D environment corresponding to encoder-decoder architecture 200, a control unit (e.g., control unit 142 and/or control unit 196 of FIG. 1) may use the output from decoder 242 to control an object (e.g., a vehicle, one or more robotic components) within the 3D environment. For example, when the output from decoder 242 indicates a vehicle ahead of a vehicle corresponding to processing system 100, the control unit may control the vehicle to change lanes to pass the other vehicle. In another example, when the output from decoder 242 indicates a stop sign ahead, the control unit may control the vehicle to stop at an intersection.

Decoder 244 may be configured to generate a second output 248 based on the fused set of BEV features of fused image 172. In some examples, the second output 248 may include a set of 3D bounding boxes that indicate a shape and a position of one or more objects within a 3D environment. In some examples, it may be important to generate 3D bounding boxes to determine an identity of one or more objects and/or a location of one or more objects. When processing system 100 is part of an ADAS for controlling a vehicle, processing system 100 may use the second output 248 to control the vehicle within the 3D environment. A control unit (e.g., control unit 142 and/or control unit 196 of FIG. 1) may process the second output 248 to perform one or more actions.

Figure 4:
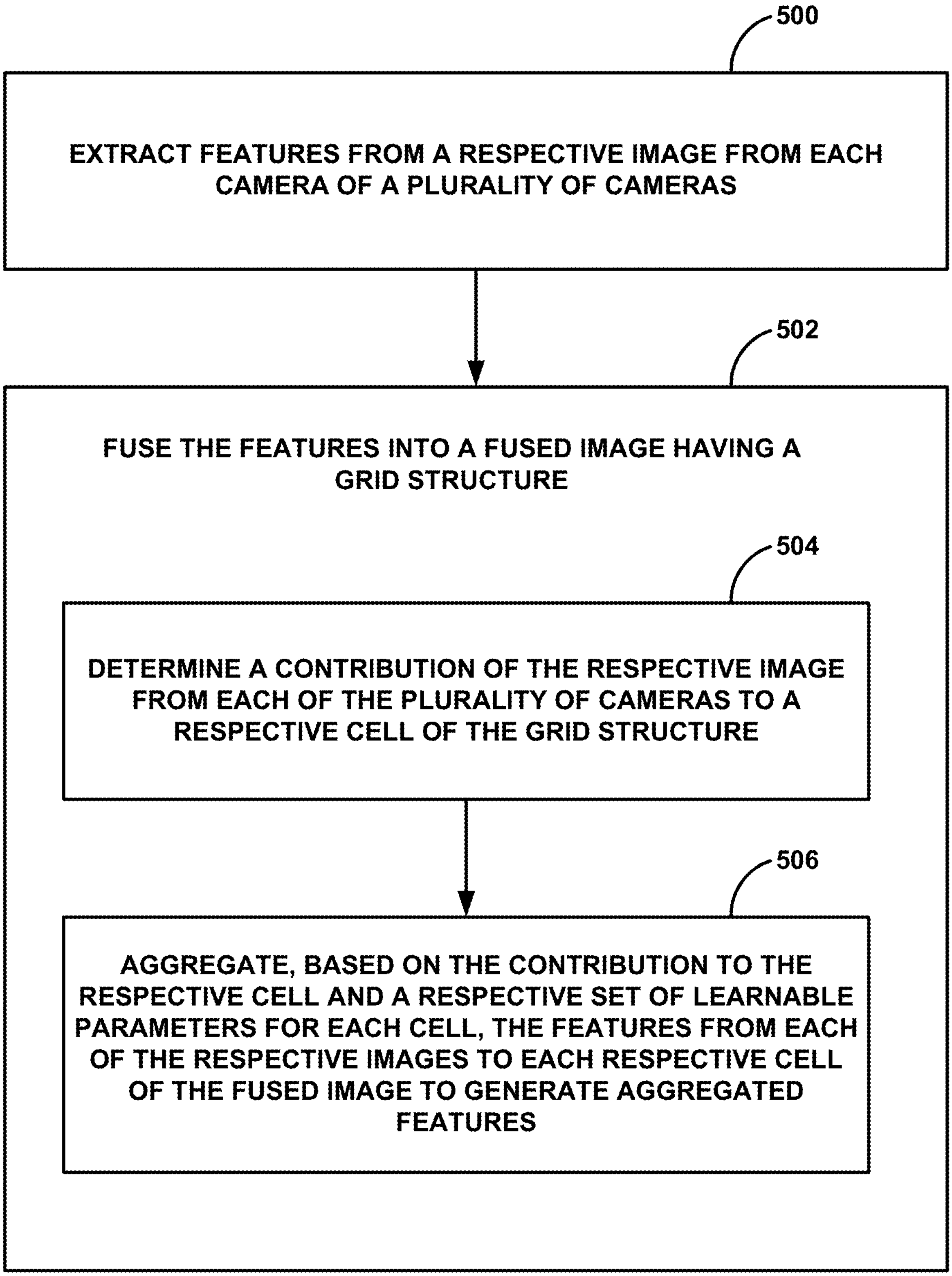
FIG. 4 is a flow diagram illustrating an example method for fusing features from a plurality of cameras in accordance with one or more techniques of this disclosure.

FIG. 4 is a flow diagram illustrating an example method for fusing features from a plurality of cameras in accordance with one or more techniques of this disclosure. FIG. 4 is described with respect to processing system 100 of FIG. 1. However, the techniques of FIG. 4 may be performed by different components of processing system 100, external processing system 180, and encoder-decoder architecture 200 of FIG. 3, or by additional or alternative systems.

Processing system 100 may be configured to extract features from a respective image from each camera of a plurality of cameras (500). As one example, processing system 100 may be configured to use an image segmentation encoder or other encoder network to extract features from each respective image received from each camera of a plurality of cameras. The term feature may generally refer to a representation learned from the input image that captures certain patterns or characteristics of objects found in the image. As described above, the plurality of cameras may capture images at a variety of different FOVs, some of the FOVs being overlapping. In addition, in some use cases, the plurality of cameras may include cameras of different types and FOVs, depth of field, or other characteristics. For example, in an automotive context, the plurality of cameras may be placed at various locations around a vehicle, capturing FOVs around all sides of the vehicle. The plurality of cameras may include both wider angle cameras (e.g., fisheye cameras), as well as cameras with a deeper depth of field (e.g., pinhole cameras).

Processing system 100 may fuse the features into a fused image having a grid structure (502). The fused image may be any type of image having a mesh or grid structure that may be reconstructed or synthesized from a plurality of different cameras. Non-limiting examples may include automotive systems, extended reality (XR) systems, virtual reality (VR) systems, spherical or 3-D video, and others. In an automotive context (e.g., as part of an ADAS), the fused image may be a BEV image having a grid structure. Each cell of the grid structure of the BEV image represents a physical location some distance from the camera system used to create the fused image (e.g., the camera system of a vehicle). In some examples, a BEV image is constructed as a 128×128 grid. That is, the BEV image has 16,384 cells. However, any grid structure may be used with the techniques of this disclosure.

A fused image with a denser grid structure (e.g., more cells) is more computationally complex, but offers a finer granularity of features. A fused image with a sparser grid structure (e.g., fewer cells) is less computationally complex, but offers a coarser granularity of features.

To fuse the features (502), processing system may be configured to determine a contribution of the respective image from each of the plurality of cameras to a respective cell of the grid structure (504). For example, processing system 100 may determine, from a lookup table (e.g., LUT 166 of FIG. 3), the contribution of the respective image from each of the plurality of cameras to the respective cell of the grid structure. The lookup table may indicate the contribution of the respective image from each of the plurality of cameras to the respective cell of the grid structure based on one or more of a configuration (e.g., location and/or FOV) of the plurality of cameras or a type (e.g., depth of field, pinhole, fisheye, etc.) of the plurality of cameras. In some examples, processing system 100 may be configured to generate the lookup table based on one or more of a configuration of the plurality of cameras or a type of the plurality of cameras. In other examples, processing system 100 may be configured to receive a pre-computed lookup table.

To fuse the features (502), processing system 100 may be further configured to aggregate, based on the contribution to the respective cell and a respective set of learnable parameters for each cell, the features from each of the respective images to each respective cell of the fused image to generate aggregated features (506). In one example, for each respective cell of the grid structure, the respective set of learnable parameters includes a weight for each of the plurality of cameras that contribute to the respective cell. As described above, the set of learnable parameters may be learned through a training process, for example, perform on encoder-decoder architecture 200 of FIG. 3. In one example, to aggregate the features, processing system 100 may calculate the aggregated features according to the function:

$$\text{aggregated\_features}_i = W_i[1]\cdot F_{i1} + W_i[2]\cdot F_{i2} + \ldots\ W_i[N_i]\cdot F_{iNi}.$$

In the foregoing function, i represents the respective cell, $\text{aggregated\_features}_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

In some examples, processing system 100 (e.g., segmentation unit 143) may be configured to apply, to the fused image, a 3D object detection decoder (e.g., 3DOD decoder 244 of FIG. 3) to generate a set of bounding boxes that indicate a location of one or more objects within the fused image. In other examples, processing system 100 (e.g., segmentation unit 143) may be configured to apply, to the fused image, a segmentation decoder (e.g., segmentation decoder 242 of FIG. 3) to identify types of objects in the fused image. Control unit 142 may then make one or more autonomous driving decisions based on the output of the object detection decoder and/or the segmentation decoder. Additional aspects of the disclosure are detailed in numbered clauses below.

Clause 1. An apparatus for processing image data, the apparatus comprising: a memory for storing the image data; and processing circuitry in communication with the memory, wherein the processing circuitry is configured to: extract features from a respective image from each camera of a plurality of cameras; and fuse the features into a fused image having a grid structure, wherein to fuse the features, the processing circuitry is configured to: determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

Clause 2. The apparatus of Clause 1, wherein to determine the contribution, the processing circuitry is configure to: determine, from a lookup table, the contribution of the respective image from each of the plurality of cameras to the respective cell of the grid structure.

Clause 3. The apparatus of Clause 2, wherein the lookup table indicates contribution of the respective image from each of the plurality of cameras to the respective cell of the grid structure based on one or more of a configuration of the plurality of cameras or a type of the plurality of cameras.

Clause 4. The apparatus of any of Clauses 2-3, wherein the processing is circuitry is further configured to: generate the lookup table based on one or more of a configuration of the plurality of cameras or a type of the plurality of cameras.

Clause 5. The apparatus of any of Clauses 1-4, wherein, for each respective cell of the grid structure, the respective set of learnable parameters includes a weight for each of the plurality of cameras that contribute to the respective cell.

Clause 6. The apparatus of Clause 5, wherein to aggregate, based on the contribution to the respective cell and the respective set of learnable parameters for each cell, the features from each of the respective images to each respective cell of the fused image to generate aggregated features, the processing circuitry is configured to: calculate the aggregated features according to a function:

$$\text{aggregated\_features}_i = W_i[1]\cdot F_{i1} + W_i[2]\cdot F_{i2} + \ldots\ W_i[N_i]\cdot F_{iNi},$$

wherein i is the respective cell, $\text{aggregated\_features}_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

Clause 7—The apparatus of any of Clauses 1-6, wherein the processing is circuitry is further configured to: apply, to the fused image, object detection decoder to generate a set of bounding boxes that indicate a location of one or more objects within the fused image.

Clause 8. The apparatus of any of Clauses 1-7, wherein the processing is circuitry is further configured to: apply, to the fused image, a segmentation decoder to identify types of objects in the fused image.

Clause 9. The apparatus of any of Clauses 1-8, wherein the processing circuitry and the memory are part of an advanced driver assistance system (ADAS).

Clause 10. The apparatus of any of Clauses 1-9, wherein the apparatus further comprises: the plurality of cameras.

Clause 11. A method for processing image data, the method comprising: extracting features from a respective image from each camera of a plurality of cameras; and fusing the features into a fused image having a grid structure, wherein fusing the features comprises: determining a contribution of the respective image from each of the plurality of cameras to a respective cell of the grid structure, and aggregating, based on the contribution to the respective cell and a respective set of learnable parameters for each cell, the features from each of the respective images to each respective cell of the fused image to generate aggregated features.

Clause 12. The method of Clause 11, wherein determining the contribution comprises: determining, from a lookup table, the contribution of the respective image from each of the plurality of cameras to the respective cell of the grid structure.

Clause 13. The method of Clause 12, wherein the lookup table indicates contribution of the respective image from each of the plurality of cameras to the respective cell of the grid structure based on one or more of a configuration of the plurality of cameras or a type of the plurality of cameras.

Clause 14. The method of any of Clauses 12-13, further comprising: generating the lookup table based on one or more of a configuration of the plurality of cameras or a type of the plurality of cameras.

Clause 15. The method of any of Clauses 11-14, wherein, for each respective cell of the grid structure, the respective set of learnable parameters includes a weight for each of the plurality of cameras that contribute to the respective cell.

Clause 16. The method of Clause 15, wherein aggregating, based on the contribution to the respective cell and the respective set of learnable parameters for each cell, the features from each of the respective images to each respective cell of the fused image to generate aggregated features comprises: calculating the aggregated features according to a function:

$$\text{aggegated\_features}_i = W_i[1]\cdot F_{i1} + W_i[2]\cdot F_{i2} + \ldots\ W_i[N_i]\cdot F_{iNi},$$

wherein i is the respective cell, aggregated_features$_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

Clause 17. The method of any of Clauses 11-16, further comprising: applying, to the fused image, object detection decoder to generate a set of bounding boxes that indicate a location of one or more objects within the fused image.

Clause 18. The method of any of Clauses 11-17, further comprising: applying, to the fused image, a segmentation decoder to identify types of objects in the fused image.

Clause 19. The method of any of Clauses 11-18, wherein the method is performed by an advanced driver assistance system (ADAS).

Clause 20. A non-transitory computer-readable storage medium storing instructions that, when executed, cause one or more processors to: extract features from a respective image from each camera of a plurality of cameras; and fuse the features into a fused image having a grid structure, wherein to fuse the features, the processing circuitry is configured to: determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features.

Clause 21. The non-transitory computer-readable storage medium of Clause 20, wherein to determine the contribution, the instructions further cause the one or more processors to: determine, from a lookup table, the contribution of the respective image from each of the plurality of cameras to the respective cell of the grid structure.

Clause 22. The non-transitory computer-readable storage medium of Clause 21, wherein the lookup table indicates contribution of the respective image from each of the plurality of cameras to the respective cell of the grid structure based on one or more of a configuration of the plurality of cameras or a type of the plurality of cameras.

Clause 23. The non-transitory computer-readable storage medium of Clause 21, wherein the instructions further cause the one or more processors to: generate the lookup table based on one or more of a configuration of the plurality of cameras or a type of the plurality of cameras.

Clause 24. The non-transitory computer-readable storage medium of any of Clauses 20-23, wherein, for each respective cell of the grid structure, the respective set of learnable parameters includes a weight for each of the plurality of cameras that contribute to the respective cell.

Clause 25. The non-transitory computer-readable storage medium of Clause 24, wherein to aggregate, based on the contribution to the respective cell and the respective set of learnable parameters for each cell, the features from each of the respective images to each respective cell of the fused image to generate aggregated features, the instructions further cause the one or more processors to: calculate the aggregated features according to a function:

$$\text{aggregated\_features}_i = W_i[1]\cdot F_{i1} + W_i[2]\cdot F_{i2} + W_i[N_i]\cdot F_{iNi},$$

wherein i is the respective cell, aggregated_features$_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

Clause 26. An apparatus configured for processing image data, the apparatus comprising: means for extracting features from a respective image from each camera of a plurality of cameras; and means for fusing the features into a fused image having a grid structure, wherein the means for fusing the features comprises: means for determining a contribution of the respective image from each of the plurality of cameras to a respective cell of the grid structure, and means for aggregating, based on the contribution to the respective cell and a respective set of learnable parameters for each cell, the features from each of the respective images to each respective cell of the fused image to generate aggregated features.

Clause 27. The apparatus of Clause 26, wherein the means for determining the contribution comprises: means for determining, from a lookup table, the contribution of the respective image from each of the plurality of cameras to the respective cell of the grid structure.

Clause 28. The apparatus of Clause 27, wherein the lookup table indicates contribution of the respective image from each of the plurality of cameras to the respective cell of the grid structure based on one or more of a configuration of the plurality of cameras or a type of the plurality of cameras.

Clause 29. The apparatus of any of Clauses 26-28, wherein, for each respective cell of the grid structure, the respective set of learnable parameters includes a weight for each of the plurality of cameras that contribute to the respective cell.

Clause 30. The apparatus of Clause 29, wherein the means for aggregating, based on the contribution to the respective cell and the respective set of learnable parameters for each cell, the features from each of the respective images to each respective cell of the fused image to generate aggregated features comprises: means for calculating the aggregated features according to a function:

$$\text{aggregated\_features}_i = W_i[1]\cdot F_{i1} + W_i[2]\cdot F_{i2} + \ldots\ W_i[N_i]\cdot F_{iNi},$$

wherein i is the respective cell, $\text{aggregated\_features}_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and applied by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be applied by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for processing image data, the apparatus comprising:

a memory for storing the image data; and processing circuitry in communication with the memory, wherein the processing circuitry is configured to:

extract features from a respective image from each camera of a plurality of cameras; and fuse the features into a fused image having a grid structure, wherein to fuse the features, the processing circuitry is configured to:

determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features, wherein the set of learnable parameters comprises a unique weight assigned to each camera of the plurality of cameras that contributes to the respective cell.

2. The apparatus of claim 1, wherein to determine the contribution, the processing circuitry is configured to:

determine, from a lookup table, the contribution of the respective image from each of the plurality of cameras to the respective cell of the grid structure.

3. The apparatus of claim 2, wherein the lookup table indicates contribution of the respective image from each of the plurality of cameras to the respective cell of the grid structure based on one or more of a configuration of the plurality of cameras or a type of the plurality of cameras.

4. The apparatus of claim 2, wherein the processing is circuitry is further configured to:

generate the lookup table based on one or more of a configuration of the plurality of cameras or a type of the plurality of cameras.

5. The apparatus of claim 1, wherein to aggregate, based on the contribution to the respective cell and the respective set of learnable parameters for each cell, the features from each of the respective images to each respective cell of the fused image to generate aggregated features, the processing circuitry is configured to:

calculate the aggregated features according to a function:

$$\text{aggregated\_features}_i = W_i[i]\cdot F_{i1} + W_i[2]\cdot F_{i2} + \ldots W_i[N_i]\cdot F_{iNi}, \quad [1]$$

wherein i is the respective cell, $\text{aggregated\_features}_i$ are the aggregated features at cell i, $W_i[1]$ is the weight of a first camera of the plurality of cameras that contributes to cell i, $F_{i1}$ is the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

6. The apparatus of claim 1, wherein the processing is circuitry is further configured to:

apply, to the fused image, object detection decoder to generate a set of bounding boxes that indicate a location of one or more objects within the fused image.

7. The apparatus of claim 1, wherein the processing is circuitry is further configured to:

apply, to the fused image, a segmentation decoder to identify types of objects in the fused image.

8. The apparatus of claim 1, wherein the processing circuitry and the memory are part of an advanced driver assistance system (ADAS).

9. The apparatus of claim 1, wherein the apparatus further comprises:

the plurality of cameras.

10. A method for processing image data, the method comprising:

extracting features from a respective image from each camera of a plurality of cameras; and fusing the features into a fused image having a grid structure, wherein fusing the features comprises:

determining a contribution of the respective image from each of the plurality of cameras to a respective cell of the grid structure, and aggregating, based on the contribution to the respective cell and a respective set of learnable parameters for each cell, the features from each of the respective images to each respective cell of the fused image to generate aggregated features, wherein the set of learnable parameters comprises a unique weight assigned to each camera of the plurality of cameras that contributes to the respective cell.

11. The method of claim 10, wherein determining the contribution comprises:

determining, from a lookup table, the contribution of the respective image from each of the plurality of cameras to the respective cell of the grid structure.

12. The method of claim 11, wherein the lookup table indicates contribution of the respective image from each of the plurality of cameras to the respective cell of the grid structure based on one or more of a configuration of the plurality of cameras or a type of the plurality of cameras.

13. The method of claim 11, further comprising:

generating the lookup table based on one or more of a configuration of the plurality of cameras or a type of the plurality of cameras.

14. The method of claim 10, wherein aggregating, based on the contribution to the respective cell and the respective set of learnable parameters for each cell, the features from each of the respective images to each respective cell of the fused image to generate aggregated features comprises:

calculating the aggregated features according to a function:

$$\text{aggregated\_features}_i = W_i[1]\cdot F_{i1} + W_i[2]\cdot F_{i2} + \ldots W_i[N_i]\cdot F_{iNi},$$

wherein i is the respective cell, $\text{aggregated\_features}_i$ are the aggregated features at cell i, $W_i[1]$ is the weight of a first camera of the plurality of cameras that contributes to cell i, Filis the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

15. The method of claim 10, further comprising:

applying, to the fused image, object detection decoder to generate a set of bounding boxes that indicate a location of one or more objects within the fused image.

16. The method of claim 10, further comprising:

applying, to the fused image, a segmentation decoder to identify types of objects in the fused image.

17. The method of claim 10, wherein the method is performed by an advanced driver assistance system (ADAS).

18. A non-transitory computer-readable storage medium storing instructions that, when executed, cause one or more processors to:

extract features from a respective image from each camera of a plurality of cameras; and fuse the features into a fused image having a grid structure, wherein to fuse the features, the instructions further cause the one or more processors to:

determine a contribution of the respective image from each of the plurality of cameras to a respective cell of the grid structure, and aggregate, based on the contribution to the respective cell and a respective set of learnable parameters for each cell, the features from each of the respective images to each respective cell of the fused image to generate aggregated features, wherein the set of learnable parameters comprises a unique weight assigned to each camera of the plurality of cameras that contributes to the respective cell.

19. The non-transitory computer-readable storage medium of claim 18, wherein to determine the contribution, the instructions further cause the one or more processors to:

determine, from a lookup table, the contribution of the respective image from each of the plurality of cameras to the respective cell of the grid structure.

20. The non-transitory computer-readable storage medium of claim 19, wherein the lookup table indicates contribution of the respective image from each of the plurality of cameras to the respective cell of the grid structure based on one or more of a configuration of the plurality of cameras or a type of the plurality of cameras.

21. The non-transitory computer-readable storage medium of claim 19, wherein the instructions further cause the one or more processors to:

generate the lookup table based on one or more of a configuration of the plurality of cameras or a type of the plurality of cameras.

22. The non-transitory computer-readable storage medium of claim 20, wherein to aggregate, based on the contribution to the respective cell and the respective set of learnable parameters for each cell, the features from each of the respective images to each respective cell of the fused image to generate aggregated features, the instructions further cause the one or more processors to:

calculate the aggregated features according to a function:

$$\text{aggregated\_features}_i = W_i[1]\cdot F_{i1} + W_i[2]\cdot F_{i2} + \ldots\ W_i[N_i]\cdot F_{iNi},$$

wherein i is the respective cell, aggregated_features$_i$ are the aggregated features at cell i, $W_i[1]$ is the weight of a first camera of the plurality of cameras that contributes to cell i, Filis the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

23. An apparatus configured for processing image data, the apparatus comprising:

means for extracting features from a respective image from each camera of a plurality of cameras; and means for fusing the features into a fused image having a grid structure, wherein the means for fusing the features comprises:

means for determining a contribution of the respective image from each of the plurality of cameras to a respective cell of the grid structure, and means for aggregating, based on the contribution to the respective cell and a respective set of learnable parameters for each cell, the features from each of the respective images to each respective cell of the fused image to generate aggregated features, wherein the set of learnable parameters comprises a unique weight assigned to each camera of the plurality of cameras that contributes to the respective cell.

24. The apparatus of claim 23, wherein the means for determining the contribution comprises:

means for determining, from a lookup table, the contribution of the respective image from each of the plurality of cameras to the respective cell of the grid structure.

25. The apparatus of claim 24, wherein the lookup table indicates contribution of the respective image from each of the plurality of cameras to the respective cell of the grid structure based on one or more of a configuration of the plurality of cameras or a type of the plurality of cameras.

26. The apparatus of claim 23, wherein the means for aggregating, based on the contribution to the respective cell and the respective set of learnable parameters for each cell, the features from each of the respective images to each respective cell of the fused image to generate aggregated features comprises:

means for calculating the aggregated features according to a function:

$$\text{aggregated\_features}_i = W_i[1]\cdot F_{i1} + W_i[2]\cdot F_{i2} + \ldots\ W_i[N_i]\cdot F_{iNi},$$

wherein i is the respective cell, aggregated_features$_i$ are the aggregated features at cell i, $W_i[1]$ is the weight of a first camera of the plurality of cameras that contributes to cell i, Filis the respective features of the first camera of the plurality of cameras at cell i, $W_i[2]$ is the weight of a second camera of the plurality of cameras that contributes to cell i, $F_{i2}$ is the respective features of the second camera of the plurality of cameras at cell i, $W_i[N_i]$ is the weight of an Nth camera of the plurality of cameras that contributes to cell i, and $F_{iNi}$ is the respective features of the Nth camera of the plurality of cameras at cell i.

* * * * *